US006965352B2

(12) United States Patent
Ohara et al.

(10) Patent No.: US 6,965,352 B2
(45) Date of Patent: Nov. 15, 2005

(54) ANTENNA DEVICE FOR VEHICLES AND VEHICLE ANTENNA SYSTEM AND COMMUNICATION SYSTEM USING THE ANTENNA DEVICE

(75) Inventors: Masahiro Ohara, Osaka (JP); Akio Miyajima, Osaka (JP); Tsutomu Maeda, Osaka (JP); Takefumi Inoue, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/794,091

(22) Filed: Mar. 5, 2004

(65) Prior Publication Data

US 2004/0201536 A1 Oct. 14, 2004

(30) Foreign Application Priority Data

| Apr. 8, 2003 | (JP) | 2003-103959 |
| Apr. 8, 2003 | (JP) | 2003-103960 |
| May 26, 2003 | (JP) | 2003-147249 |
| Jul. 14, 2003 | (JP) | 2003-196394 |

(51) Int. Cl.$^7$ ............................................. H01Q 7/08
(52) U.S. Cl. ....................... 343/788; 343/787; 343/711
(58) Field of Search ............................. 343/788, 787, 343/711, 713

(56) References Cited

U.S. PATENT DOCUMENTS

| 2,964,746 A | | 12/1960 | Branscombe et al. ....... 343/713 |
| 3,778,836 A | * | 12/1973 | Tanaka ......................... 343/702 |
| 3,965,474 A | * | 6/1976 | Guerrino et al. ............. 343/719 |
| 4,760,394 A | * | 7/1988 | Takeuchi et al. .......... 340/10.42 |
| 6,163,305 A | * | 12/2000 | Murakami et al. ........... 343/788 |
| 6,400,330 B1 | * | 6/2002 | Maruyama et al. .......... 343/788 |
| 2002/0033777 A1 | | 3/2002 | Maruyama et al. .......... 343/788 |

FOREIGN PATENT DOCUMENTS

| FR | 1 400 954 A | 5/1965 |
| JP | 62-039905 A | 2/1987 |
| JP | 2001-345615 | 12/2001 |
| JP | 2002-030844 | 1/2002 |
| JP | 2002-204122 A | 7/2002 |
| WO | WO 01/07736 A | 2/2001 |

OTHER PUBLICATIONS

European Search Report for EP 04 00 8430, dated Jul. 15, 2004.
European Search Report for EP 04 00 8430, dated Sep. 30, 2004.

* cited by examiner

Primary Examiner—Hoang V. Nguyen
(74) Attorney, Agent, or Firm—RatnerPrestia

(57) ABSTRACT

An antenna device for installation on vehicles, which antenna device including a core made of a magnetic material, a holding portion provided by a dielectric film sheet wound around the core, a coil formed with a linear conductor wound around the holding portion, a case made of a dielectric resin material for housing the core, the holding portion and the coil, and a flexible dielectric resin filling the space within the case excluding the core, the holding portion and the coil.

8 Claims, 7 Drawing Sheets

ANTENNA DEVICE FOR VEHICLES AND VEHICLE ANTENNA SYSTEM AND COMMUNICATION SYSTEM USING THE ANTENNA DEVICE

FIELD OF THE INVENTION

The present invention relates to an antenna device installed on a vehicle for use in the keyless entry system, with which system the vehicle door can be locked/unlocked by a remote control operation. The invention discloses a vehicle antenna system and a communication system containing the antenna device, too.

BACKGROUND OF THE INVENTION

The keyless entry system which locks/unlocks vehicle door by a remote control operation has become popular, and the design of vehicles has become diversified. There are increasing demands for a compact antenna device that can be installed easily on such sorts of vehicles.

A conventional antenna device for vehicles is described in the following, referring to FIG. 7 and FIG. 8.

FIG. 7 is a perspective view showing the key part of a conventional vehicle antenna device. In FIG. 7, core 1 is made of a ferrite material. Bobbin 2 has a blank at the central portion, and the holding portion is made of a dielectric resin. Outer surface of bobbin 2 is wound around with a linear conductor to form coil 3. The central portion of bobbin 2 is penetrated by core 1.

Case 4 is for housing bobbin 2 and other items. Case 4 is provided with lead terminals 5, 6 and relay elements 13, 14, which are insert-molded.

Relay element 13 is electrically connected with lead 3A, which being one of the two ends of coil 3, by soldering or the like means; while lead terminal 5 is likewise connected with lead 3B, which being the other end of coil 3.

Relay element 13 is electrically connected also with lead 9A, which being one of the two ends of capacitor 9, while the other end of capacitor 9, or lead 9B, is connected with relay element 14.

Furthermore, lead 11A, which being one of the two ends of resistor 11, is electrically connected with relay element 14, while the other end, or lead 11B, is connected with lead terminal 6.

The space within case 4 excluding coil 3, core 1, bobbin 2, capacitor 9, resistor 11, relay elements 13 and 14, and lead terminals 5 and 6 is filled with flexible dielectric resin 12.

As shown in a circuit diagram, FIG. 8, coil 3, capacitor 9 and resistor 11 are connected in series. Both ends of which serially connected line are connected with lead terminals 5 and 6, respectively. Vehicle antenna device 15 has such configuration.

Lead terminals 5 and 6 are electrically coupled with a control circuit (not shown) built in a vehicle body. The control circuit and vehicle antenna device 15 integrally constitute a serial resonance circuit.

Japanese Patent Laid-Open Application No. 2001-345615 represents a known prior art information relevant to the present invention.

In the above-described conventional vehicle antenna device 15, since core 1 has to be inserted into the blank central portion of bobbin 2 a certain clearance needs to be provided between bobbin 2 and core 1. Furthermore, body of bobbin 2 needs to have a certain specific thickness to ensure a high physical strength enough to withstand a possible deformation caused when coil 3 is formed. As the result, the overall size of vehicle antenna device 15 naturally becomes bulky.

The conventional vehicle antenna device and a vehicle antenna system and a communication system containing the antenna device are described below referring to FIG. 9.

FIG. 9 is a drawing used to show the concept of a conventional communication system. In FIG. 9, vehicle antenna device 15 transmits/receives electromagnetic waves for communication with a third party; fixing portion 16 is for installing a mirror close to the door at driver's seat, and at passenger seat. Movable portion 17 is for holding a mirror, and foldable.

Vehicle antenna device 15 is housed in movable portion 17; vehicle antenna device 15 and movable portion 17 integrally form vehicle antenna system 18.

Card 19 is proprietary to a vehicle equipped with vehicle antenna system 18 for communication. A communication system is structured by a combination of card 19, vehicle antenna system 18 and a control circuit (not shown) connected to vehicle antenna system 18.

Under the above setup, the control circuit regularly outputs a signal to card 19 held by a vehicle driver, requesting to respond with the ID code. Vehicle antenna device 15 transmits the signal after converting it into electromagnetic wave of a certain specific resonance frequency.

When a vehicle driver holding card 19 makes access to be close to the vehicle and card 19 receives the electromagnetic wave, card 19 transmits ID code signal after converting it into electromagnetic wave.

After that, when the electromagnetic wave is received by vehicle antenna device 15 and the incoming ID code is recognized to be true by the control circuit, the vehicle door is automatically unlocked. In a case when it is not recognized to be true, or failed to receive the ID code sent from a vehicle driver going away from the vehicle, the door is automatically locked.

Japanese Patent Laid-Open Application No. 2002-30844 is a known prior art information relevant to the present invention.

Under the above-described conventional vehicle antenna device 15 and a communication system which contains vehicle antenna device 15, however, the directivity of antenna is dislocated when movable portion 17 holding a mirror is folded by a vehicle driver. Vehicle antenna device 15 built in movable portion 17 is moved to a different orientation. As a result, there has been a problem that a reliable remote control operation is not ensured even when a driver is within a certain distance range from the vehicle.

SUMMARY OF THE INVENTION

The present invention offers an antenna device for installation on vehicles for receiving electromagnetic wave airing between the vehicle and outside the vehicle. The antenna device includes a core made of a magnetic material, a coil formed by a linear conductor wound around the core, a case made of a dielectric resin material for housing the core and the coil, and a dielectric resin filling the space within the case excluding the core, holding portion and the coil.

DESCRIPTION OF PREFERRED EMBODIMENTS

Exemplary embodiments of the present invention are described in the following, with reference to FIG. 1 through FIG. 6.

Those constituent parts whose structures are substantially identical to those of conventional technologies are represented respectively by using identical symbols, and descriptions on such parts have been simplified.

(First Embodiment)

Figure 1:
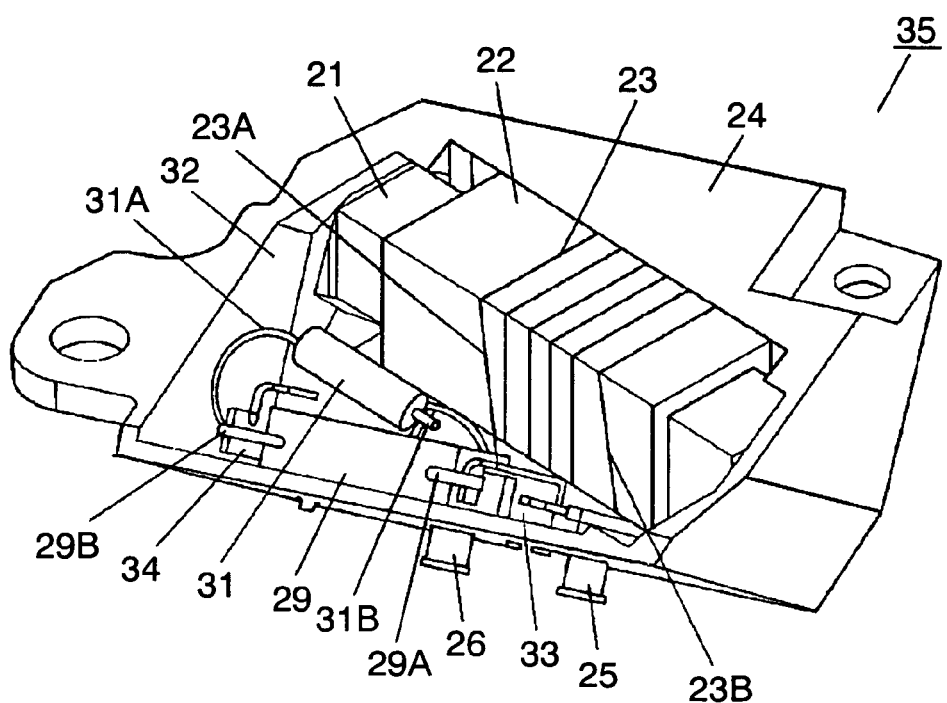
FIG. 1 is a perspective view showing the key part of a vehicle antenna device in accordance with a first exemplary embodiment of the present invention.

FIG. 1 is a perspective view showing the key part of a vehicle antenna device in accordance with a first exemplary embodiment of the present invention. Referring to FIG. 1, core 21 is made of ferrite or the like magnetic material, holding portion 22 is formed of a film sheet of polyethylene terephthalate or the like dielectric material. Core 21 is wound around by holding portion 22 for at least one turn.

Coil 23 is formed by a linear conductor wound around the outer surface of holding portion 22.

Preferred thickness of the film sheet for holding portion 22 is 0.025–0.05 mm; it is because of easy availability and easy winding operation around core 21.

Thinner holding portion 22 provides the closer attachment of coil 23 to core 21. Therefore, the thinner film sheet results in the greater magnetic permeability, and number of turns of the linear conductor can be decreased for forming coil 23.

Case 24 for housing coil 23, core 21, etc. is provided with relay elements 33, 34 and lead terminals 25, 26 formed of conductor sheet, which being insert-molded.

Core 21 is disposed in case 24 so that there is a distance of at least 5 mm between the outer surface of core 21 and the outer surface of case 24.

In the above-described configuration, at least a clearance of 5 mm is ensured between core 21 and metal surface of a vehicle body even in an occasion where case 24 is mounted immediately direct on the metal surface of a vehicle body.

Lead 23A, which being one of the two ends of coil 23, is electrically connected with relay element 33 by soldering or the like means; while lead 23B, or the other end of coil 23, is likewise connected with lead terminal 25.

Lead 29A, which being one of the two ends of capacitor 29, is electrically connected with relay element 33; while lead 29B, or the other end, with relay element 34.

In addition, lead 31A, which being one of the two ends of resistor 31, is electrically connected with relay element 34; while lead 31B, or the other end, with lead terminal 26.

The space inside of case 24, excluding coil 23, core 21, holding portion 22, capacitor 29, resistor 31, relay elements 33 and 34, lead terminals 25 and 26, is filled with resin 32, which is silicone or the like flexible dielectric material.

Figure 2:
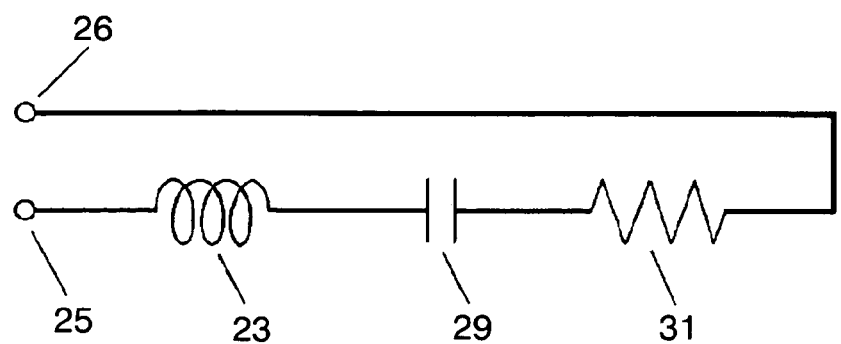
FIG. 2 shows circuit diagram of the antenna device.

As illustrated in a circuit diagram shown in FIG. 2, coil 23, capacitor 29 and resistor 31 are connected in series. The two ends of the serially connected line are provided with lead terminals 25 and 26, and vehicle antenna device 35 is completed.

Lead terminals 25 and 26 are electrically connected to a control circuit (not shown) built in a vehicle body, so that the control circuit and vehicle antenna device 35 integrally form a serial resonance circuit.

Figure 3:
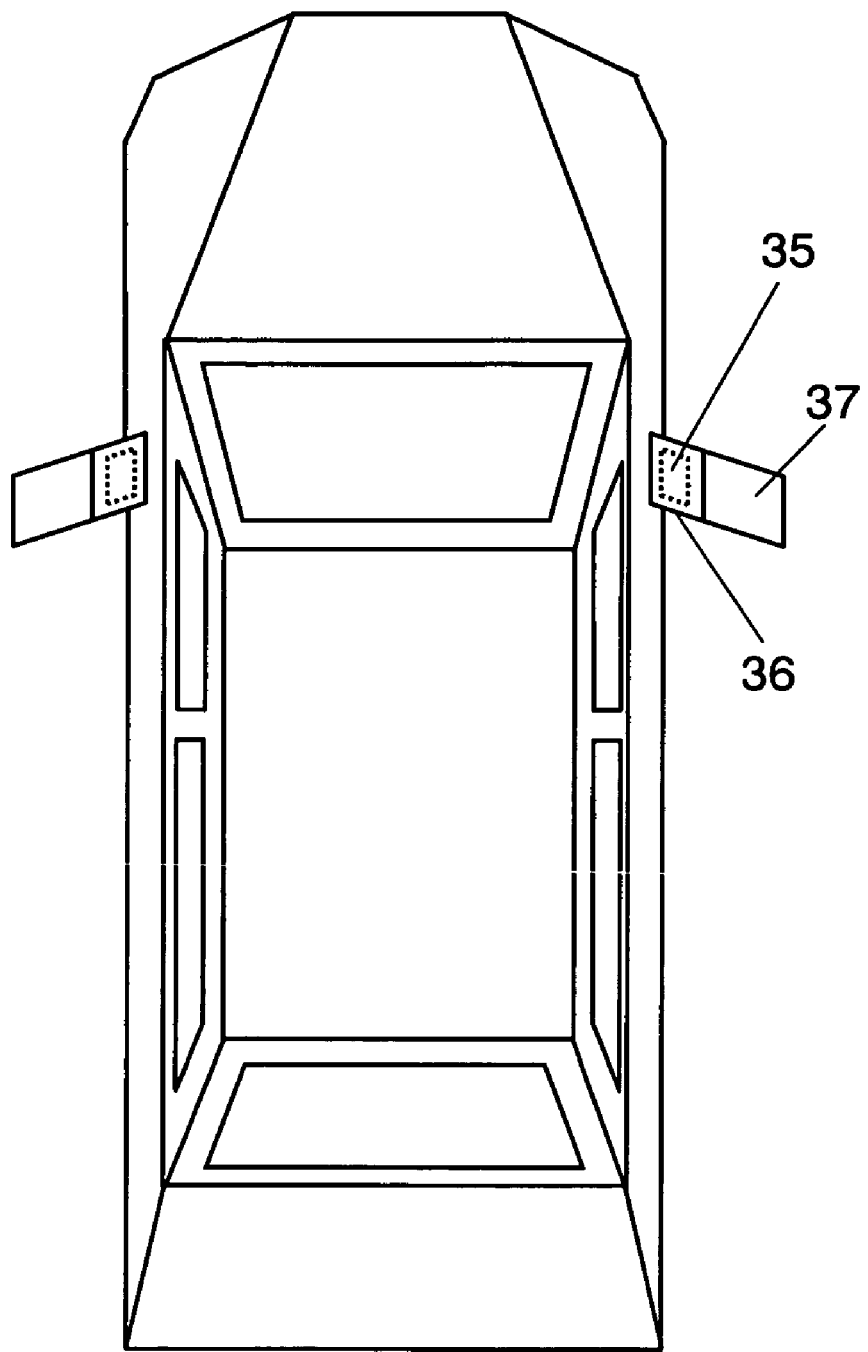
FIG. 3 shows an installation layout of the antenna device on a vehicle.

As shown in FIG. 3, vehicle antenna device 35 is mounted within a vehicle mirror disposed adjacent to the door at driver's seat, and that at passenger seat; in the vehicle mirror's installation premises 36 used for installing it on a vehicle body.

Installation premises 36 remains fixed unmoved even when mirror portion 37 is revolved. Material of the vehicle body corresponding to installation premises 36 is not a metal, but it is polybutylene terephthalate or the like dielectric resin material.

In the above-described configuration, when a vehicle card for keyless entry system makes access to the vehicle, vehicle antenna device 35 receives electromagnetic wave of a certain predetermined resonance frequency specific to the vehicle card, and then the electromagnetic wave is converted into an electric signal, and delivered to the control circuit.

Upon detecting the signal, the control circuit outputs a signal requesting to send an ID code proprietary to the vehicle card. Vehicle antenna device 35 transmits electromagnetic wave representing the signal.

Upon receiving the electromagnetic wave, the vehicle card transmits an ID code signal after converting it into electromagnetic wave.

When antenna device 35 receives the electromagnetic wave and the control circuit recognizes that the incoming ID code is true, door of the vehicle is unlocked automatically. When the code is not recognized to be true, or it failed to receive an ID code, the door is automatically locked.

Figure 4A:
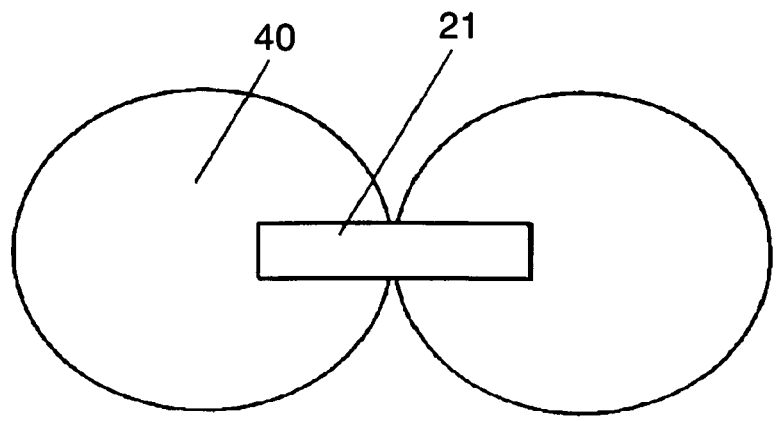
FIG. 4A, FIG. 4B and FIG. 4C are idea charts showing the directivity of antenna.

As shown in a concept drawing of antenna directivity, FIG. 4A, directivity 40 designates a scope of electromagnetic wave whose energy strength is higher than a certain specific level. The scope spreads in a spherical shape around the vicinity of the right and the left ends of core 21.

Figure 4B:
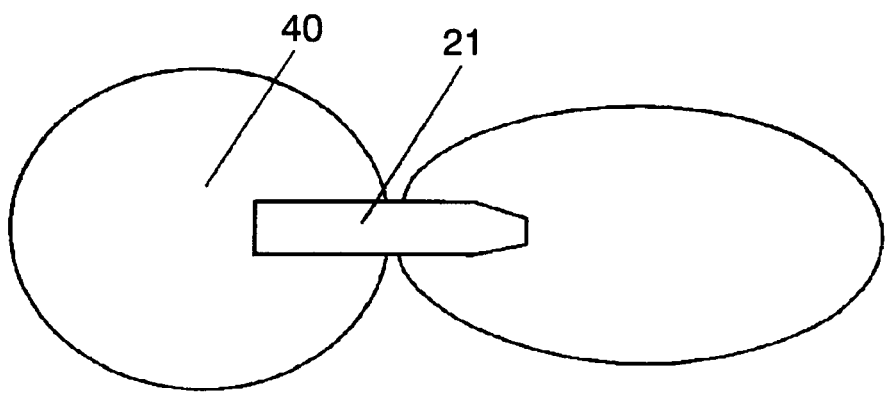

When the vicinity of the right end, for example, of core 21 is shaped to be finer than that at the left end by cutting or other means, as shown in FIG. 4B, density of magnetic lines at the right end increases to be higher than that at the left counterpart. In this way, directivity at the right end can be elongated to be more slender as compared to the left end counterpart.

Figure 4C:
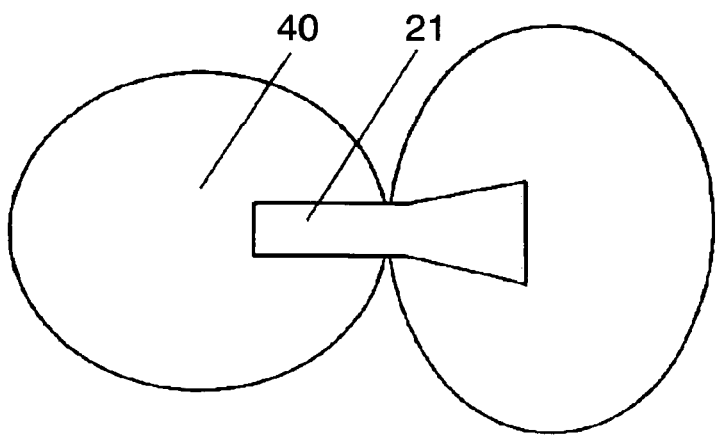

Contrary, if core 21 is processed at the vicinity of the right end to be thicker than the left end, as shown in FIG. 4C, density of magnetic lines at the right end decreases to be lower than that at the left end. In this way, directivity at the right end can be made to shrink to a thicker and shrunk shape as compared to the left end counterpart.

In the above descriptions, the core is shaped at the vicinity of the right end along sloped planes. However, it is not limited to a sloped plane, but the core may be shaped along stepped planes for modifying directivity 40.

In the above descriptions, although core area at the vicinity of the right end is made to be different in relation to the left end counterpart, the left end area may be made to be different in relation to the right end counterpart for the purpose of modifying directivity 40.

Directivity 40 can be modified in this way, because density of magnetic lines at the vicinity of the left end, or the right end, of core 21 can be changed by shaping core 21 so that it has different area at the vicinity of the left end, or the right end, in relation to cross sectional area at the rest portions.

In the present first embodiment, vehicle antenna device 35 has been formed with core 21 of magnetic material, holding portion 22 provided by winding a dielectric film sheet around core 21, coil 23 formed with a linear conductor wound around holding portion 22, case 24 made of dielectric resin for housing core 21, holding portion 22 and coil 23, and flexible dielectric resin 32 filling the space within case 24 excluding core 21, holding portion 22 and coil 23. Since holding portion 22 is provided by winding a film sheet around core 21, there is no need of providing a gap between holding portion 22 and core 21. Another advantage of this structure is that holding portion 22 can be formed in a thin contour. Thus the present invention offers vehicle antenna device 35 that is compact in the overall size and easy to mount on a vehicle body.

Since core 21 is disposed within case 24 securing a certain specific distance from the outer surface of case 24, the increase of a so-called eddy current loss is prevented. The eddy current loss is a heat loss with electromagnetic wave due to eddy current in metal portion caused by magnetic flux which is generated by core 21. Thus a steady range of communication can be established for transmission/reception of electromagnetic waves.

Furthermore, in the present communication system, vehicle antenna device 35 is mounted within a vehicle mirror at the installation premises which is used for installing the mirror on a vehicle, and communication with a third party is conducted via vehicle antenna device 35. Since the installation premises stays fixed even when the mirror is revolved, the range of transmission/reception remains unchanged before and after the revolution of a mirror. Thus the steady range of communication is maintained unchanged.

Furthermore, since the density of magnetic lines at the vicinity of the left end, or the right end, of core 21 can be changed by making the cross sectional area at the vicinity of the left end or the right end, to be different in relation to that in the remaining portion, the directivity can be modified with ease.

Still further, since thickness of holding portion 22 is not thicker than 1 mm, and the thinner the greater with a rate of magnetic permeation, number of windings of linear conductor can be reduced. Thus the present invention offers an inexpensive vehicle antenna device that is easy to assemble.

Although core 21 in the above description is provided with holding portion 22, coil 23 can be wound immediately on core 21 in a case where core 21 is made of an insulating magnetic material. The present invention can be implemented in this way either.

The above descriptions have been based on a configuration that vehicle antenna device 35 is mounted within a vehicle mirror disposed adjacent to the door at driver's seat, and that at passenger seat, at installation premises 36 which is used for installing the mirror on a vehicle body. Instead, the antenna device may be mounted within a vehicle mirror disposed above the front wheel, at installation premises which is used for installing the mirror on vehicle body above the front wheel.

Although the above descriptions have been based on the concept of bidirectional communication system where both the vehicle card and vehicle antenna device 35 transmit/receive electromagnetic waves, the present invention can be embodied in a unidirectional communication system. For example, in a communication system where vehicle key transmits electromagnetic wave representing ID code proprietary to the key, while vehicle antenna device 35 receives it to lock/unlock the vehicle door.

As described in the above, the present invention offers a substantial advantage that it implements a compact and easy-to-mount vehicle antenna device, and a communication system containing the antenna device.

(Second Embodiment)

Figure 5:
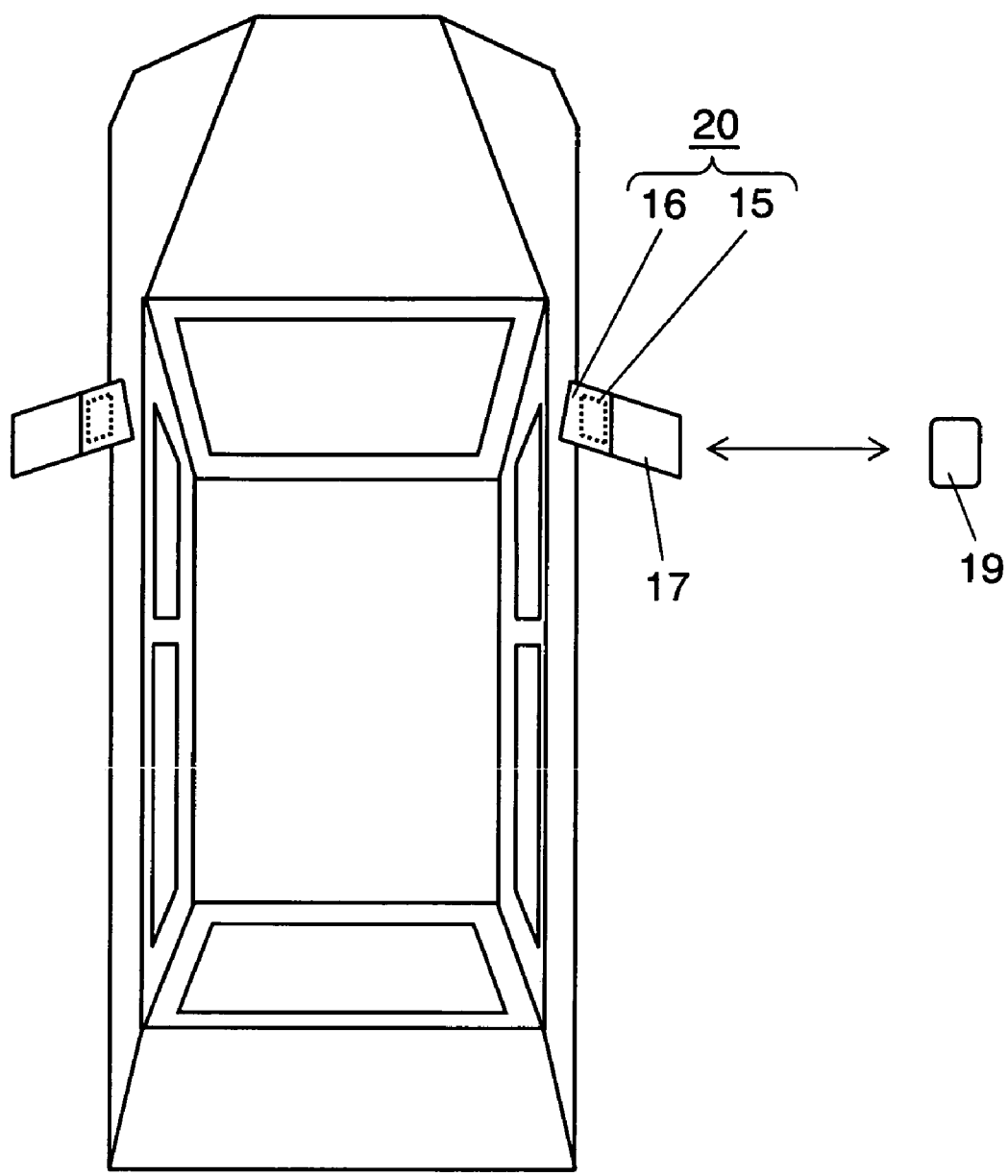
FIG. 5 illustrates concept of a communication system in accordance with a second exemplary embodiment of the present invention.

FIG. 5 is the drawing used to show the concept of a communication system in accordance with a second exemplary embodiment of the present invention. In FIG. 5, vehicle antenna. device 35 transmits/receives electromagnetic waves for communication with a third party, fixing portion 16 is for holding a vehicle mirror (hereinafter referred to as mirror) close to the door at driver's seat, and at passenger seat, which portion is formed with polybutylene terephthalete or the like dielectric resin material.

Vehicle antenna device 35 is housed in fixing portion 16, and fixing portion 16 and vehicle antenna device 35 integrally form vehicle antenna system 20.

Card 19 which is proprietary to a certain specific vehicle is used to communicate with vehicle antenna system 20. Card 19, vehicle antenna system 20 and a control circuit (not shown) connected with vehicle antenna system 20 integrally constitute a communication system.

Figure 6:
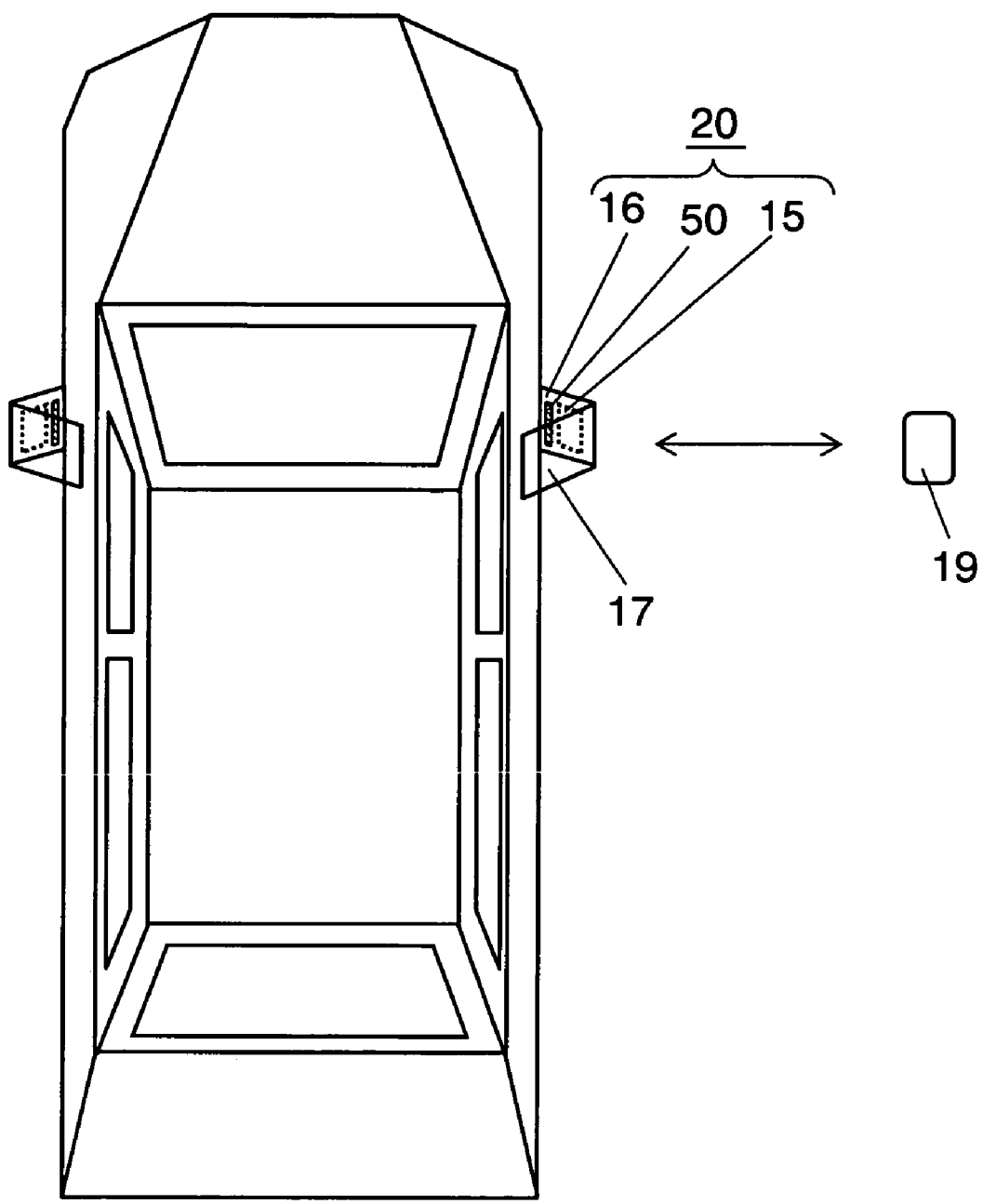
FIG. 6 illustrates the concept of the communication system when the movable portion is folded.
Figure 7:
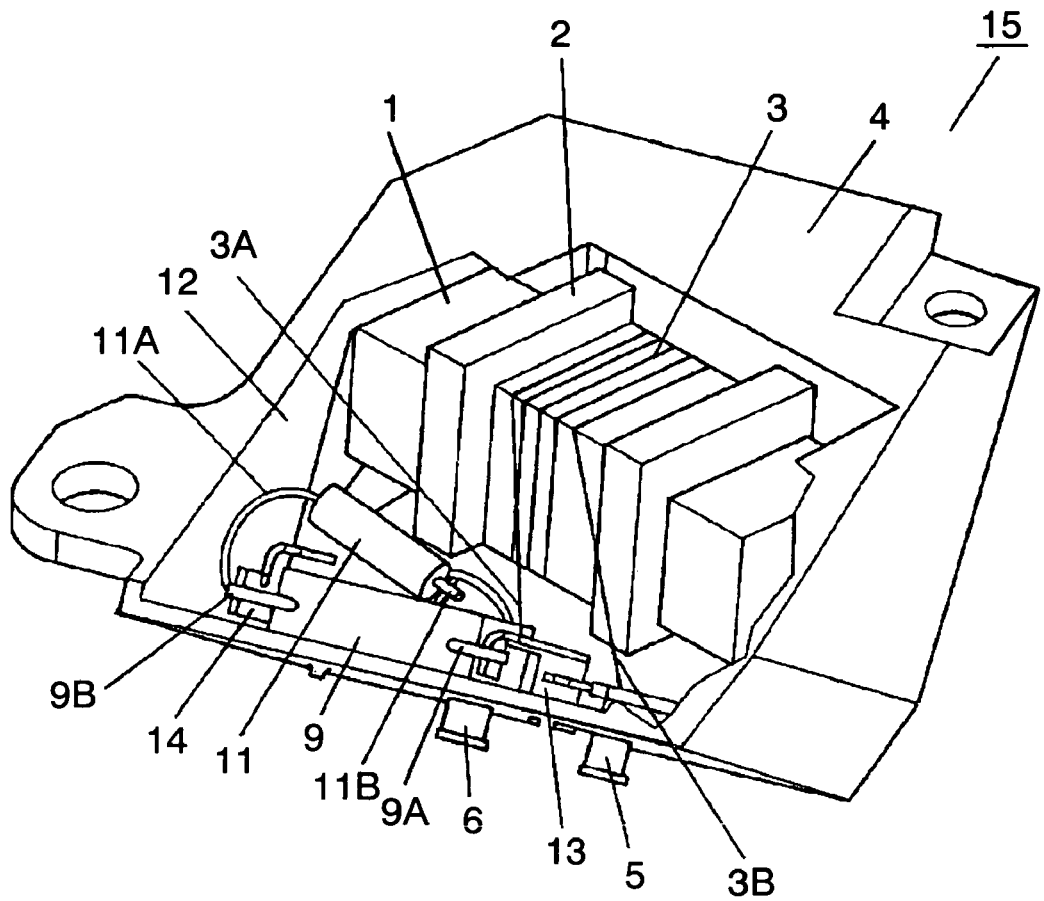
FIG. 7 is a perspective view showing the key part of a conventional vehicle antenna device.
Figure 8:
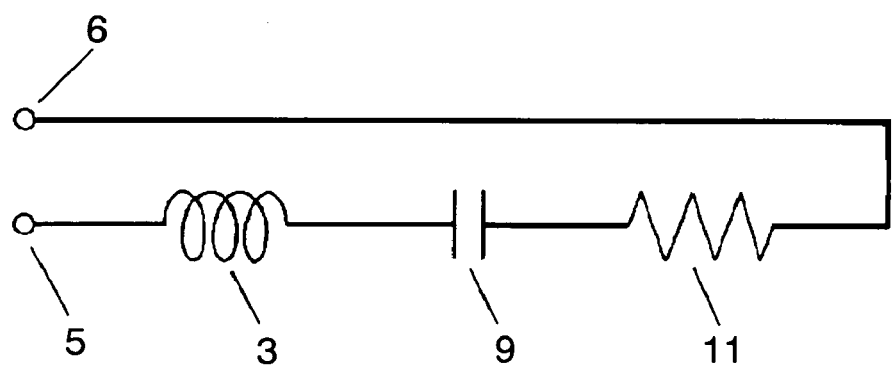
FIG. 8 shows circuit diagram of the conventional vehicle antenna device.
Figure 9:
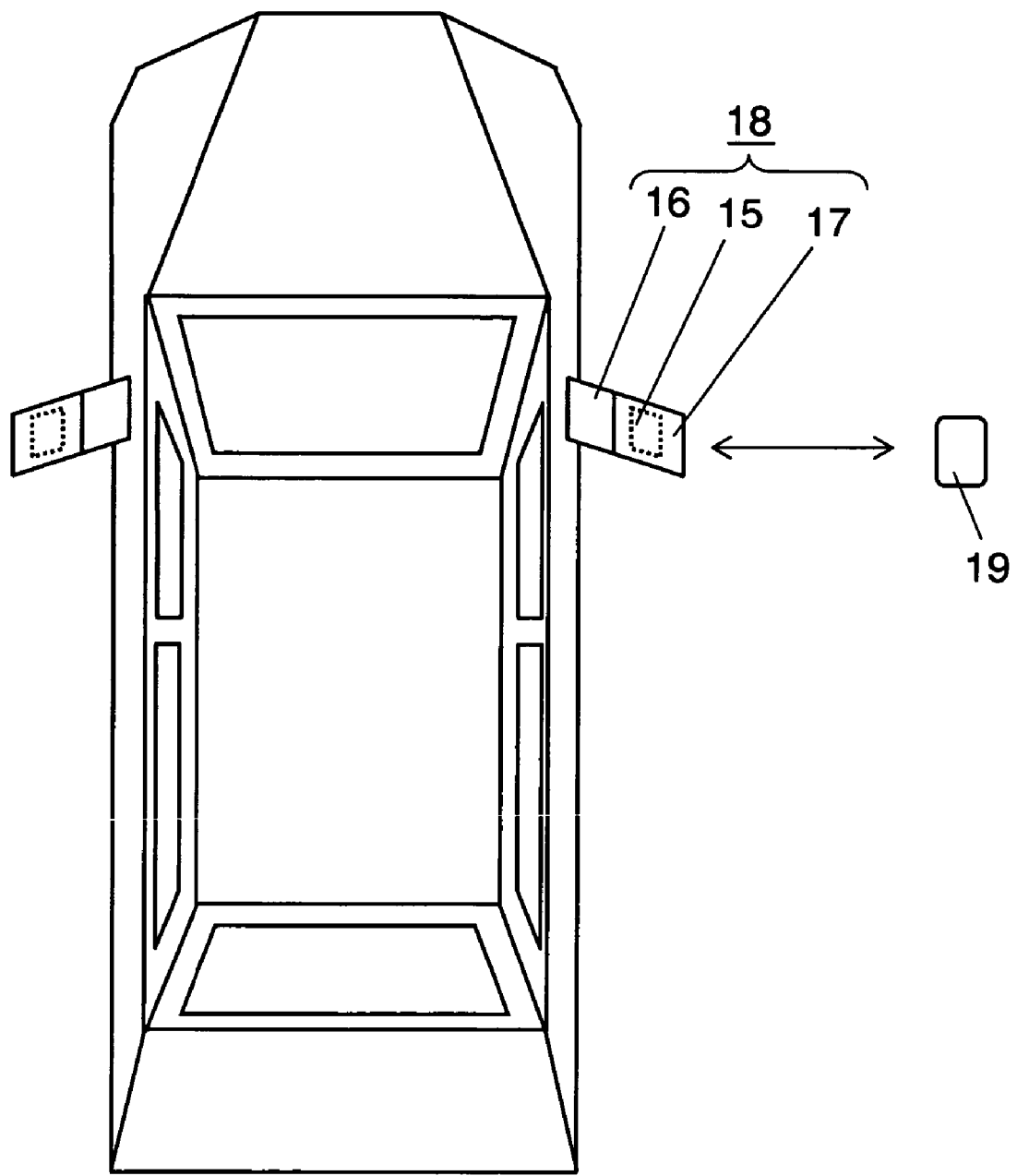
FIG. 9 illustrates the concept of a conventional communication system.

As shown in the conceptual illustration when movable portion 17 is folded, FIG. 6, fixing portion 16 for holding a mirror stays fixed unmoved even after movable portion 17 holding the mirror is folded by a vehicle driver.

Since orientation of vehicle antenna device 35 disposed within fixing portion 16 does not change, the directivity of vehicle antenna system 20 stays unchanged before and after the folding action given to the mirror.

Unlike movable portion 17, there are no such metal components as motor, cam, etc. needed for revolving a mirror in fixing portion 16. Vehicle antenna device 35 has been housed within fixing portion 16.

In vehicle antenna device 35, there exists more amount of magnetic flux at a place closer to end face of core 21. So, the amount of heat loss with electromagnetic wave due to eddy current in metal portion which is caused by the magnetic flux is greater in a region closer to the end face.

In a case where vehicle antenna device 35 is disposed within the inside of fixing portion 16 in accordance with the present invention, it is easier to prevent the growing heat loss with electromagnetic waves due to eddy current in the adjacent metal parts, since there are less metal items in the neighborhood as compared with a case where it is disposed in movable portion 17. Namely, it is easier to avoid a narrowed directivity range.

Furthermore, since fixing portion 16 is disposed outside of a vehicle body at a place off the vehicle's metal door, vehicle antenna device 35 disposed in fixing portion 16 in accordance with the present invention is locating away from metal parts as compared to a case where it is housed within a vehicle door or a door handle. Therefore, like in the earlier-described case, it is easier to prevent the growing heat loss with electromagnetic wave due to eddy current in the adjacent metal parts. Namely, it is easier to avoid a narrowed directivity range.

In the above setup, the control circuit regularly outputs a signal towards vehicle driver's proprietary card 19 requesting to respond with an ID code. Vehicle antenna device 35 transmits the signal after converting it into electromagnetic wave of a certain specific resonance frequency.

When a vehicle driver holding proprietary card 19 makes access to the vehicle and card 19 receives the electromagnetic wave, card 19 transmits ID code signal after converting it to electromagnetic wave.

When vehicle antenna device 35 receives the electromagnetic wave and the control circuit recognizes the incoming ID code to be true, the vehicle door is unlocked automatically. If the control circuit failed to recognize it to be true, or unable to receive an ID code from a vehicle driver going away from the vehicle, the door is automatically locked.

Vehicle antenna system 20 in the present second embodiment is formed by housing vehicle antenna device 35, which is consisting of at least core 21 of magnetic material and coil 23 wound around on the outer surface of core 21, within fixing portion 16 which has been provided for holding a vehicle mirror. Since fixing portion 16 does not move and stays as it is even after movable portion 17 holding the mirror is folded by a vehicle driver, the directivity of antenna stays unchanged. Thus the present invention implements vehicle antenna system 20 which ensures a reliable remote control operation between a vehicle driver and the vehicle within a certain distance range, and a communication system containing the antenna system.

When conductive metal plate 50 is provided between fixing portion 16 at the vehicle body side and vehicle antenna device 35, the directivity of vehicle antenna device 35 disposed at the vicinity of door at driver's seat, or at passenger seat, for example, is blocked by conductive metal plate 50 and hardly expands in the direction towards the inside of vehicle room. As the result, the directivity of vehicle antenna device 35 at driver's seat and that at passenger seat hardly overlap.

Under the above configuration, suppose a vehicle driver holding a card makes access to a vehicle from the driver's seat side, the control circuit of vehicle receives signal from vehicle antenna device 35 at the driver's seat, while there is no input from vehicle antenna device 35 at passenger seat. Therefore, in addition to a communication system which unlocks all of the doors of a vehicle at once, a different communication system can be structured; which unlocks only the door at driver's seat, while the door at passenger seat remains locked.

The above descriptions have been based on a configuration that vehicle antenna device 35 is housed within fixing portion 16 which has been provided for holding a vehicle mirror adjacent to the door at driver's seat, and that at passenger seat. Instead, the antenna device may be mounted within a stick-shaped fixing portion provided for installing the mirror on a vehicle body above the front wheel.

The above descriptions have been based on a bidirectional communication system where both of proprietary card 19 and vehicle antenna device 35 perform transmission/reception of electromagnetic waves. Instead, it can be implemented on a unidirectional communication system. An example is a so-called keyless entry system where a specific key for insertion to a key hole proprietary to a vehicle is integrated with a transmitting element; when a vehicle driver presses a transmission button of the key to transmit electromagnetic wave representing a proprietary ID code, the vehicle antenna receives it for locking/unlocking the door.

As described in the above, the present invention offers the advantage of implementing a vehicle antenna device and a communication system containing antenna device, which ensure a reliable remote control operation between a vehicle driver and the vehicle within a certain distance range.

What is claimed is:

1. An antenna device for installation on vehicles for receiving electromagnetic waves airing between the vehicle and the outside comprising
   a core made of a magnetic material;
   a holding portion film sheet made of dielectric material wound around the core;
   a coil formed with a linear conductor wound around the outer surface of the holding portion;
   a case made of a dielectric resin material for housing the core, the holding portion, and the coil; and
   a dielectric resin filling the space within the case excluding the core, the holding portion, and the coil.

2. The vehicle antenna device of claim 1, wherein
   the core is disposed with a certain specific gap from the outer surface of the case.

3. The vehicle antenna device of claim 1,
   further provided with a directivity of electromagnetic wave by changing a cross section area of at least either left or right and vicinity of the core of the antenna device.

4. The vehicle antenna device of claim 1, wherein
   thickness of the holding portion is not more than 1 mm.

5. A communication system comprising
   a vehicle antenna device for transmitting electromagnetic waves to the outside of vehicles or receiving electromagnetic waves coming from outside the vehicle, which antenna device comprising
   a core made of a magnetic material,
   a holding portion film sheet made of dielectric material wound around the core;
   a coil formed with a linear conductor wound around the outer surface of the holding portion;
   a case made of a dielectric resin material for housing the core, the holding portion, and the coil; and
   a dielectric resin filling the space within the case excluding the core, the holding portion, and the coil;
   wherein the vehicle antenna device is disposed within a vehicle mirror at a location close to the vehicle mirror's installation premises which is used for installing the mirror on a vehicle body.

6. A vehicle antenna system comprising
   a vehicle antenna device which is comprising at least a core made of a magnetic material and a coil wound around the outer surface of the core; and
   a mirror portion composed of a movable portion installed on a vehicle mirror and a fixing portion for fixing the movable portion fold-away; wherein
   the antenna device is housed within the fixing portion of the mirror portion.

7. The vehicle antenna system of claim 6, further provided with a conductive metal plate disposed between the fixing portion at the vehicle side and the vehicle antenna device.

8. A communication system for conducting communication with a third party via a vehicle antenna system which contains a vehicle antenna device formed of at least a core made of a magnetic material and a coil wound around the core; and
   a mirror portion composed of a movable portion installed on a vehicle mirror and a fixing portion for fixing the movable portion fold-away; wherein the antenna device is housed within the fixing portion of the mirror portion.

* * * * *